Figure 2:
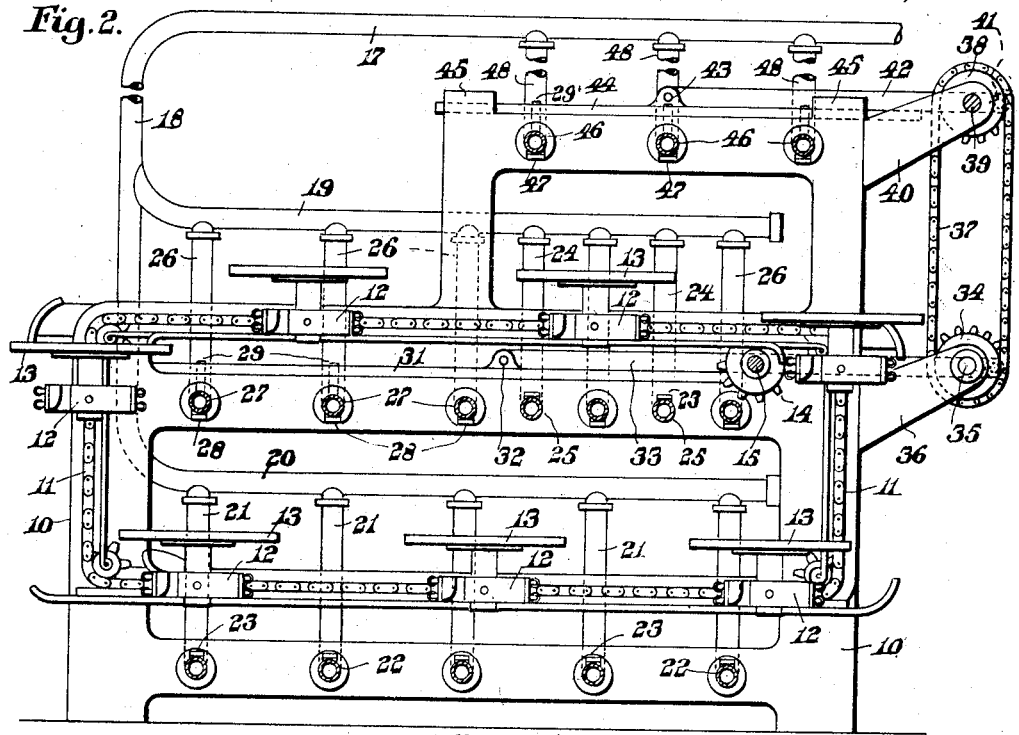

F. W. LEYLAND AND E. P. BROCK.
CONVEYING AND COOLING APPARATUS FOR CONFECTIONS AND THE LIKE.
APPLICATION FILED FEB. 28, 1920.

1,364,121. Patented Jan. 4, 1921.

Inventors:
Frederick W. Leyland,
Edward P. Brock,
by Walter E. Lombard, Atty.

UNITED STATES PATENT OFFICE.

FREDERICK W. LEYLAND, OF CAMBRIDGE, AND EDWARD P. BROCK, OF BOSTON, MASSACHUSETTS.

CONVEYING AND COOLING APPARATUS FOR CONFECTIONS AND THE LIKE.

1,364,121.     Specification of Letters Patent.     Patented Jan. 4, 1921.

Application filed February 28, 1920. Serial No. 361,988.

*To all whom it may concern:*

Be it known that we, FREDERICK W. LEYLAND, a citizen of the United States of America, and a resident of Cambridge, in the county of Middlesex and Commonwealth of Massachusetts, and EDWARD P. BROCK, a citizen of the United States of America, and a resident of Boston, in the county of Suffolk and Commonwealth of Massachusetts, have invented certain new and useful Improvements in Conveying and Cooling Apparatus for Confections and the like, of which the following is a specification.

This invention relates to machines for cooling confections and the like and has for its object the provision of a device of this character in which the material placed upon the movable trays is subjected to sprays of cool air ejected onto the opposite faces of said material.

The invention consists of certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Figure 1:
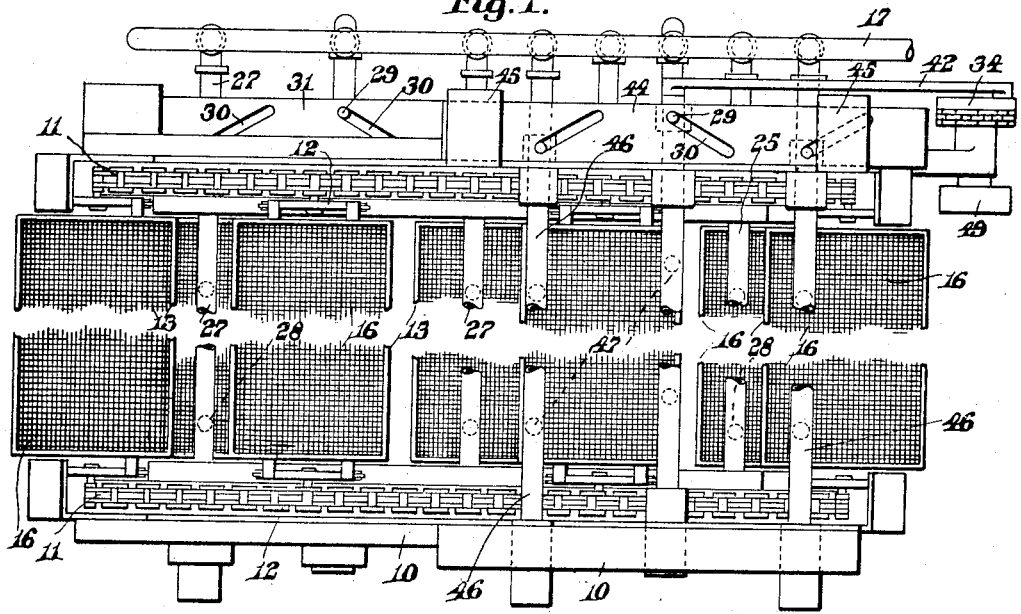

Of the drawings:

Figure 1 represents a plan of a machine embodying the principles of the present invention, and Fig. 2 represents a longitudinal vertical section of the same.

Similar characters indicate like parts throughout the several figures of the drawings.

In the drawings, 10 is a frame having mounted thereon, endless conveyer chains 11 having pivotally connected thereto, carriages 12 supporting trays 13.

The conveyer chains 11 are driven by the sprocket wheels 14 on a driving shaft 15.

As far as the present invention is concerned, any suitable means may be employed for keeping the trays 13 horizontal while passing from one level to another.

Such a means is shown in another application filed by us Feb. 9, 1920 and numbered 357,361.

The bottom of the trays 13 are preferably formed of wire mesh 16 so that air may be admitted to the tray through the bottom.

A pipe 17 leads from a suitable tank containing air under pressure and this pipe 17 has a vertical portion 18 from which lead the branch pipes 19 and 20.

The pipes 17, 19 and 20 are preferably parallel with each other as indicated in Fig. 2 of the drawings.

The pipe 20 has a plurality of vertical pipes 21 leading therefrom, each communicating with a transverse pipe 22 extending from one side frame 10 to the other beneath the path of the trays 13.

Each of these pipes 22 is provided with a plurality of spray nozzles 23 through each of which a spray of air is projected onto the material resting on the perforated bottoms 16 of the trays 13 as they are moved in a horizontal direction at the lower level of the machine.

The pipe 19 is similarly provided with downwardly extending vertical pipes 24 communicating with transverse pipes 25 having a plurality of spray nozzles 23 therein through which air is adapted to be ejected onto the bottom of the material in the trays 13 as said trays move in a horizontal direction on the upper level of the machine.

This pipe 19 is also provided with a plurality of downwardly extending flexible pipes 26, the lower ends of which communicate with the transverse pipes 27 having spray nozzles 28 in the under sides thereof through which air is adapted to be ejected onto the top of the material in the trays 13 as said trays move in a horizontal direction on the lower level of the machine.

These pipes 27 are adapted to be moved endwise in bearings in the side frames 10 of the machine.

To accomplish this reciprocatory movement, each pipe 27 is provided with a projection 29 extending through an inclined slot 30 in a reciprocating plate 31.

This plate 31 has pivoted thereto at 32, a link 33, the opposite end of which is pivotally connected to a crank disk 34 revoluble about the axis of the shaft 35 in a bracket 36 extending from the ends of one of the side frames 10.

The crank disk 34 has sprocket teeth thereon coacting with a sprocket chain 37 which drives another sprocket wheel 38 secured to and revoluble with a shaft 39 on a bracket 40 extending from one of the side frames 10.

This sprocket 38 has pivotally connected thereto at 41, a link 42 the opposite end of which is pivotally connected to an ear 43 of a reciprocating plate 44 mounted to slide in bearings 45 in one end of the side frames 10 and having a plurality of inclined slots 30 therein.

Beneath the reciprocating plate 44 are a plurality of reciprocating pipes 46 having spray nozzles 47 in the under side thereof through which air is adapted to be ejected onto the material in the trays 13 as said trays 13 move in a horizontal direction on the upper level of the machine.

The pipes 46 reciprocate endwise in bearings in the side frames 10 and one end of each of these pipes is connected by a flexible pipe 48 with the air supply pipe 17.

The reciprocating movement is imparted to the pipes by the action of the inclined slots 30 on the projections 29 extending upwardly therefrom into said slots.

The supply pipe 17 leads to a compressed air tank from which the supply of air under pressure is conveyed to the various spray nozzles.

As this compressed air tank forms no part of the present invention and any usual construction may be used, it is thought that it is unnecessary to illustrate the same.

The air entering the compressed air tank is preferably washed by any suitable device adapted for this purpose and provision is made for cooling the air before its admission to the supply pipe 17 and the system of piping communicating therewith.

As these cooling and washing devices form no part of the present invention, they are not illustrated in the drawings.

When the apparatus is in use, air from the compressed air tank is admitted to the supply pipe 17 and a plurality of sprays of cold air are ejected onto the tops and bottoms of the material in the various trays 13.

The various sprays overlap as they contact with the material and certain of the spray pipes are adapted to be reciprocated endwise so that as the conveyor chains 11 move the trays 13 with confections or other similar material thereon, the entire surface of said material is subjected to the cooling effects of the air sprayed thereon.

The sprocket chain 37 is driven by means of a pulley 49 secured to the shaft 39.

By means of a machine of this character, the confections and other material may be cooled rapidly upon a machine occupying but little floor space.

The economy in space in a candy factory and also the economy in finishing the material is a great advantage.

It is believed that the operation and many advantages of the invention will be readily understood without further description.

Having thus described our invention, we claim:

1. In a machine of the class described, the combination of an endless conveyer; a plurality of trays mounted on and moved by said conveyer; a system of pipes including a plurality of perforated pipes extending transversely of the machine and adapted to eject sprays of air upon the contents of said trays; and means for imparting movement to said pipes.

2. In a machine of the class described, the combination of an endless conveyer; a plurality of trays mounted on and moved by said conveyer; a system of pipes including a plurality of perforated pipes extending transversely of the machine and adapted to eject sprays of air upon the contents of said trays; and means for imparting reciprocatory movement to said pipes.

3. In a machine of the class described, the combination of an endless conveyer; a plurality of trays mounted on and moved by said conveyer; perforated pipes extending transversely of the machine; an air supply pipe; and flexible pipes connecting said transverse pipes to said supply pipe.

4. In a machine of the class described, the combination of an endless conveyer; a plurality of trays mounted on and moved by said conveyer; perforated pipes extending transversely of the machine; an air supply pipe; flexible pipes connecting said transverse pipes to said supply pipe; and a cam mechanism for imparting reciprocatory movement to said transverse pipes.

Signed by us at 746-7 Old South Bldg., Boston, Mass., this 26th day of February, 1920.

FREDERICK W. LEYLAND.
EDWARD P. BROCK.

Witnesses:
WALTER E. LOMBARD,
NATHAN C. LOMBARD.